United States Patent
Kroulik et al.

[11] Patent Number: 6,145,793
[45] Date of Patent: Nov. 14, 2000

[54] ROBOTIC MIG CLAMP

[75] Inventors: Erwin K. Kroulik, Edmore; Richard J. Balaguer, Ortonville, both of Mich.

[73] Assignee: Interservices, Inc., Dundee, Ill.

[21] Appl. No.: 09/298,388

[22] Filed: Apr. 23, 1999

[51] Int. Cl.[7] .............................. F16L 3/12; H02G 7/14
[52] U.S. Cl. .............................. 248/74.1; 174/42
[58] Field of Search ................ 248/74.1, 73, 228.4, 248/229.23, 230.4, 231.51, 228.1, 229.2, 230.1, 59, 71; 174/42

[56] References Cited

U.S. PATENT DOCUMENTS

| | | | |
|---|---|---|---|
| 1,797,899 | 3/1931 | Cudney | 248/59 |
| 1,992,555 | 2/1935 | Templin | 174/42 |
| 1,995,620 | 3/1935 | Monroe | 174/42 |
| 2,850,560 | 9/1958 | Heyob et al. | 248/71 |
| 3,446,907 | 5/1969 | Bouche | 174/42 |
| 3,563,504 | 2/1971 | Gordon | 248/68 |
| 4,209,659 | 6/1980 | Hawkins | 174/42 |
| 4,259,541 | 3/1981 | Bouche | 174/42 |
| 4,291,855 | 9/1981 | Schenkel et al. | 248/74.1 |
| 4,674,720 | 6/1987 | Fetsch | 248/74.1 |
| 5,133,523 | 7/1992 | Daigle et al. | 248/74.1 |
| 5,257,762 | 11/1993 | Trame et al. | 248/50 |

*Primary Examiner*—Ramon O. Ramirez
*Assistant Examiner*—Jon Szumny
*Attorney, Agent, or Firm*—Taylor & Aust, P.C.

[57] ABSTRACT

The invention is directed to a clamp for retaining a fluid hose and/or electrical cable on a robot arm assembly. The clamp includes a base adapted to mount to the robot arm assembly and a top. The base and arm cooperate to allow the top to hinge or swing into an open and closed position to retain the welder. A grommet is preferably retained by the opening defined by the arcuate portions of the top and base. The base may be mounted to the robot arm assembly by a spring assembly or otherwise. A spring mount assembly utilizes a compression spring to provide coupling between the clamp and a mounting plate. Threaded studs are received into the ends of the spring which creates axial elongation for a radially inward force to retain the stud.

18 Claims, 4 Drawing Sheets

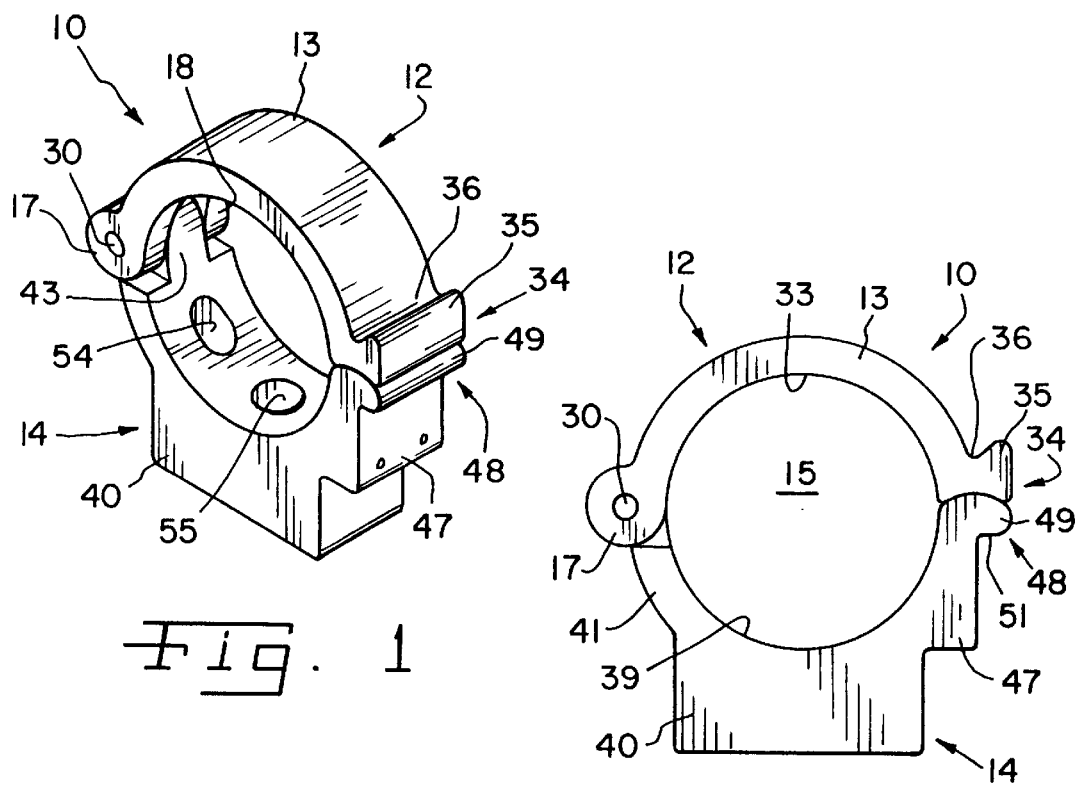
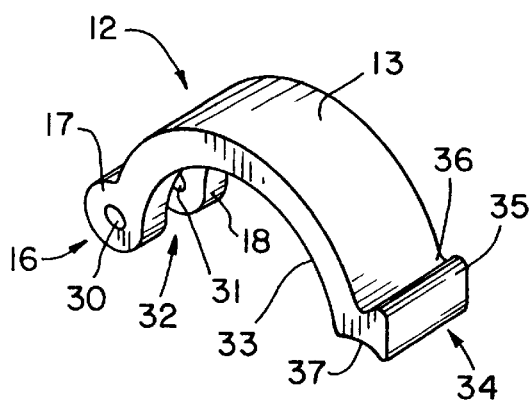
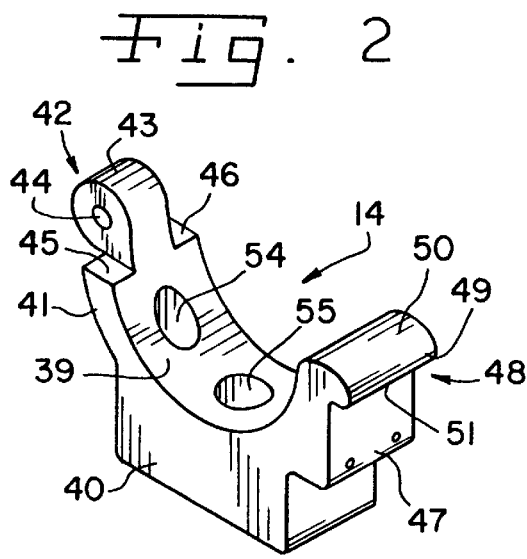
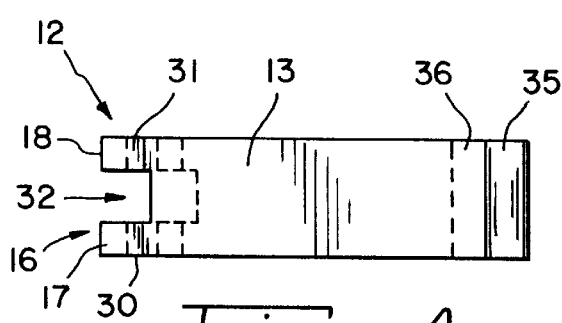
Fig. 1
Fig. 2
Fig. 3
Fig. 4
Fig. 5

ROBOTIC MIG CLAMP

BACKGROUND OF THE INVENTION

1. Field of the Invention

The present invention relates to clamps for tools and, more specifically to a clamp for retaining a tool on a robot assembly.

2. Description of the Related Art

Robots are now used in many manufacturing facilities for many types of products. The robots generally include arm assemblies that carry many types of tools as well as assemblies to guide cables, hoses and the like. Various cable retainer assemblies are known to deal with the problem of loose cables. Such retainer assemblies generally consist of complementary grooved plates that hold the cable therein in parallel.

In some applications, robots are used to weld various parts such as in automobile manufacturing. Naturally, the robots must positively retain the welder in order that the proper places get welded. As well, fluid hoses and electrical cables associated with the welder must be retained in order to prevent premature wearing of the cables and interference with the welding or robot actions.

In many MIG welding applications, typically smaller cables, smaller welding guns, and smaller robots are used. MIG welders are conventionally held on the robot by plates with Velcro used to hold the associated cables. Needless to say, these arrangements do not provide a positive hold on the welder to accomplish the precise welding of many applications.

What is needed is a lightweight but sturdy clamp assembly for fluid hoses and electrical cables that provides a positive hold on the fluid hoses and electrical cables and, additionally provides a positive, but easily unlatchable latching or clasp structure.

What is further needed is a lightweight but sturdy clamp assembly that provides movement and flexibility while providing a positive attachment to both the robot assembly and the fluid hoses and/or electrical cables.

SUMMARY OF THE INVENTION

The present invention provides a clamp assembly for releasably and flexibly retaining a work tool, especially a MIG welder, and associated electrical cables onto a robot.

The invention comprises a clamp and mount assembly each preferably having a threaded stud which threads or screws into a respective end of a compression spring. The clamp releasably retains the cable or hose while the mount is secured to the robot assembly. Orientational flexibility for precise movement/alignment of the cable is provided by the spring.

In one form thereof, the clamp has a base and a pivoting arm. The base and arm together, when latched, surround and positively retain the electrical cables and hoses onto the robot. The threaded stud of the clamp is received into the inner diameter of one end of the compression spring in an interference fit. Threading the stud into the compression spring causes the spring to elongate or expand along its longitudinal axis around the threaded stud and proximate thereto. Attempts to unthread the stud axially compresses the spring making backing out extremely difficult.

The mount is securable to the robot and likewise includes a threaded stud. The threaded stud of the mount is received into the inner diameter of the other end of the compression spring in an interference fit. Threading the stud into the compression spring causes the spring to elongate or expand along its longitudinal axis around the threaded stud and proximate thereto. Attempts to unthread the stud axially compresses the spring making backing out extremely difficult.

In one form thereof, the base of the clamp includes an arcuate portion, a first hinge structure, and a first latch structure. The arm includes an arcuate portion, a second hinge structure, and a second latch structure. The two arcuate portions together define a ring that surrounds the MIG welder and associated cables. The first and second hinge structures are configured to cooperate with each other to allow the arm to open and close around the MIG welder. The first and second latch structures are configured to cooperate with each other to provide a positive, but easily unlatchable latch or clasp structure.

Preferably, a grommet is situated within the arcuate portions. In a preferred form, the clamp is made from aluminum.

The present clamp is adapted to be mounted to the robot in many fashions. In one form, the clamp may be mounted utilizing a spring assembly which allows the associated electrical cables to move as the robot moves but which does not allow the cables to move within the clamp itself. Other mounting configurations include a mounting plate and various pipe mounting brackets. Standoffs may also be utilized in some applications.

It is an advantage of the present clamp that it is lightweight but strong.

It is another advantage of the present clamp that it has a positive latch, but is easy to open and close.

It is yet another advantage of the present clamp that it is able to positively retain both the fluid hoses and electrical cables.

It is still another advantage of the present clamp assembly that it provides a secure holder yet allows limited movement thereof.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIG. 1 is a perspective view of an embodiment of a clamp according to the present invention, the clamp shown in a closed position;

FIG. 2 is a front plan view of the clamp of FIG. 1;

FIG. 3 is a perspective view of the clamp top of FIGS. 1 and 2;

FIG. 4 is a top plan view of the clamp top of FIG. 3;

FIG. 5 is a perspective view of the clamp base of FIGS. 1 and 2;

Corresponding reference characters indicate corresponding parts throughout the several views. The exemplifications set out herein illustrate one preferred embodiment of the invention, in one form, and such exemplifications are not to be construed as limiting the scope of the invention in any manner.

DETAILED DESCRIPTION OF THE INVENTION

Figure 6:
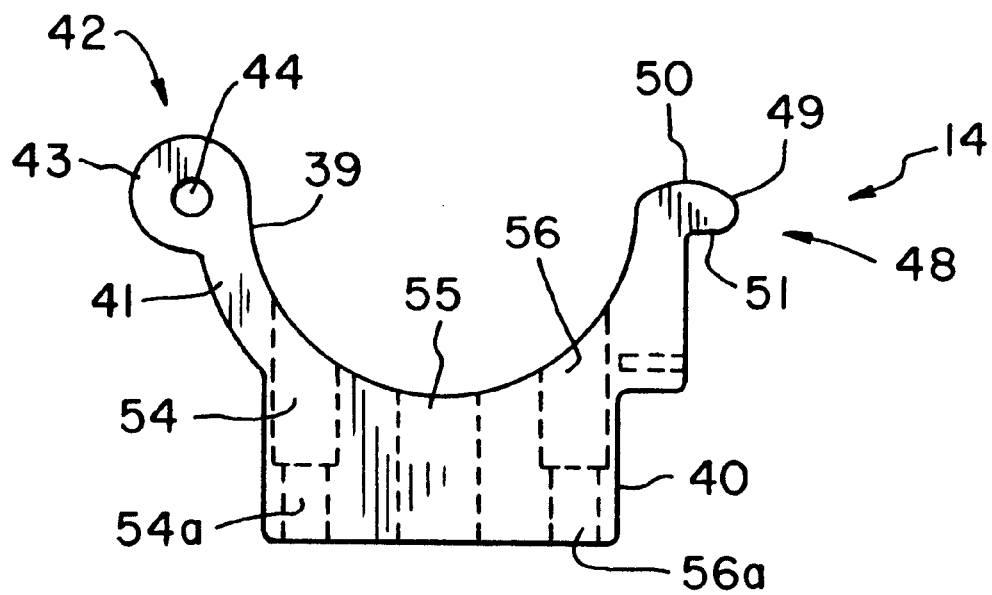
FIG. 6 is a front plan view of the clamp base of FIG. 5 showing mounting bores in phantom.

Referring now to the drawings and particularly FIGS. 1 and 2, there is shown a clamp assembly 10 having a clamp top or arm 12 and a clamp base 14. Clamp arm 12 is shown in a closed position with respect to clamp base 14. In a preferred form, clamp base 14 and clamp arm 12 are fashioned from aluminum, and more preferably from 6061 aluminum. However, it should be understood that any suitable lightweight and strong material may be utilized. Further, in a preferred embodiment, clamp 10 weighs less than one pound, and more specifically 10.5 ounces, and has a reduced width of only ⅛ inches. When clamp arm 12 is closed onto clamp base 14, an opening 15 is created in which a fluid hose and/or electrical cable (not shown) are retained. Opening 15 is generally circular-shaped and is defined between an arcuate or curved inner surface 33 of clamp arm 12 and an arcuate or curved outer surface 39 of clamp base 14. In a preferred embodiment, opening 15 is 2½ inches. Of course, other opening configurations may be used.

Referring now to FIGS. 3 and 4, clamp arm 12 is shown in greater detail. Clamp arm 12 is defined by a curved portion 13 which defines an inner curved surface 33. At one end of clamp arm 12 is a hinge portion or structure 16 defined at least in part, by a first rounded flange, prong or ear 17 and a second rounded flange, prong or ear 18. Ear 17 includes an axial bore 30. Likewise, ear 18 includes an axial bore 31. Ear 17 is spaced a distance from ear 18 and thus defines an area 32 therebetween. On another end of clamp arm 12 is a latch or clasping structure 34 having a lip or ledge 35 defining a lower surface area 37 and a valley 36 on a top surface adjacent ledge 35. Preferably, inner curved surface 33 is semi-circular in shape, but can be any shape to accommodate the fluid hose and/or electrical cable (not shown).

Referring now to FIGS. 5 and 6, clamp base 14 is shown in greater detail. Clamp base 14 is defined by a generally rectangular bottom 40 having on a top end thereof, a curved or arcuate upper or outer surface 39. Extending through bottom 40 and in communication with outer surface 39 are three mounting bores 54, 55, and 56. Mounting bores 54 and 56 each have a reduced diameter portion 54a and 56a, respectively, that may be threaded for receipt of mounting screws or bolts (not shown) such as ¼ inch bolts. In a preferred form, mounting bores 54 and 56 are spaced 1¾ inches apart, being what is known as the Robo Com V pattern. Mounting bore 55 may be a ⅝-11 threaded bore.

Clamp base 14 further has and extension 41 on a first end of upper surface 39. Extension 41 terminates in a hinge portion or structure 42 defined by a rounded flange 43 having a bore 44. Rounded flange 43 is of a width less than extension 41 and thus ledges 45 and 46 are defined on either sides of rounded flange 43. Clamp base 14 has a squared extension 47 on another end thereof having a latch structure 48. Latch structure consists of a projection or ear 49 defining an upper surface 50 that is complementary in shape to lower surface 37 of clamp arm 12, and a lower surface 51. In this manner, when clamp arm 12 is pivoted into a closed position, surface 37 abuts surface 50. Although not shown, a band or crimp may be fitted around latch structure 48 and latch structure 34 to provide positive retention.

Figure 7:
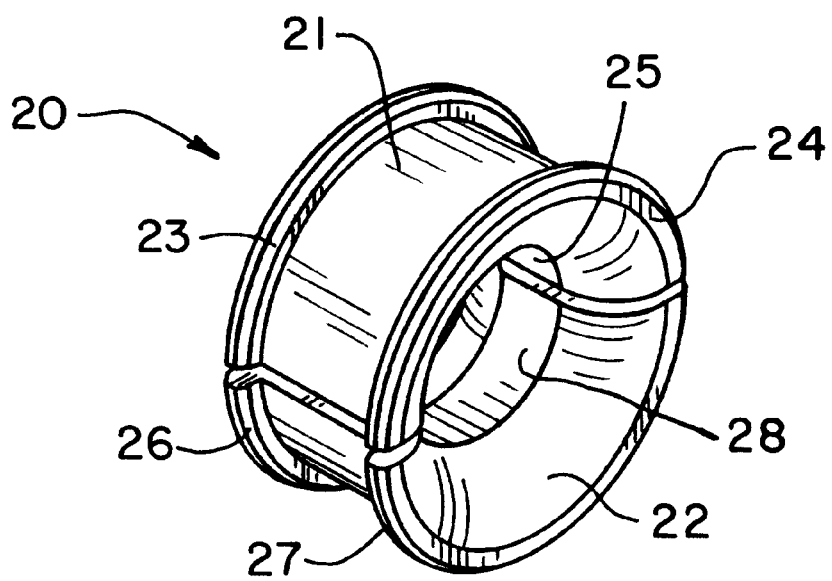
FIG. 7 is a perspective view of a grommet utilized in the clamp of FIG. 1.

Referring now to FIG. 7 there is shown a grommet 20 that is preferably used with clamp 10. Specifically, grommet 20 includes a first arcuate or semi-circular portion 21 having a first peripheral rim 23 and a second peripheral rim 24. An arcuate land portion 25 is defined as an inside surface thereof. Grommet 20 also includes a second arcuate or semi-circular portion 22 also having a first peripheral rim 26 and a second peripheral rim 27. An arcuate land portion 28 is defined as an inside surface thereof. Inside surfaces 25 and 28 come into contact with the fluid hose and/or electrical cable (not shown).

In one form thereof, grommet 20 is of the UHMW type and aids in eliminating straight edges of the clamp that might tend to wear the electrical cables associated with the welder. Further, grommet 20 is sized to be retained within hole 15. The outside surface of portion 21 is adapted to abut inside surface 33 of clamp arm 12, while the outside surface of portion 22 is adapted to abut inside surface 39 of base 14.

What has been shown and described above is a clamp structure for retaining a work tool such as a welder. Also described was the operation and use of the clamp. Clamp 10 preferably should be mounted to the robot in some manner or robot arm as the need may be.

Figure 8:
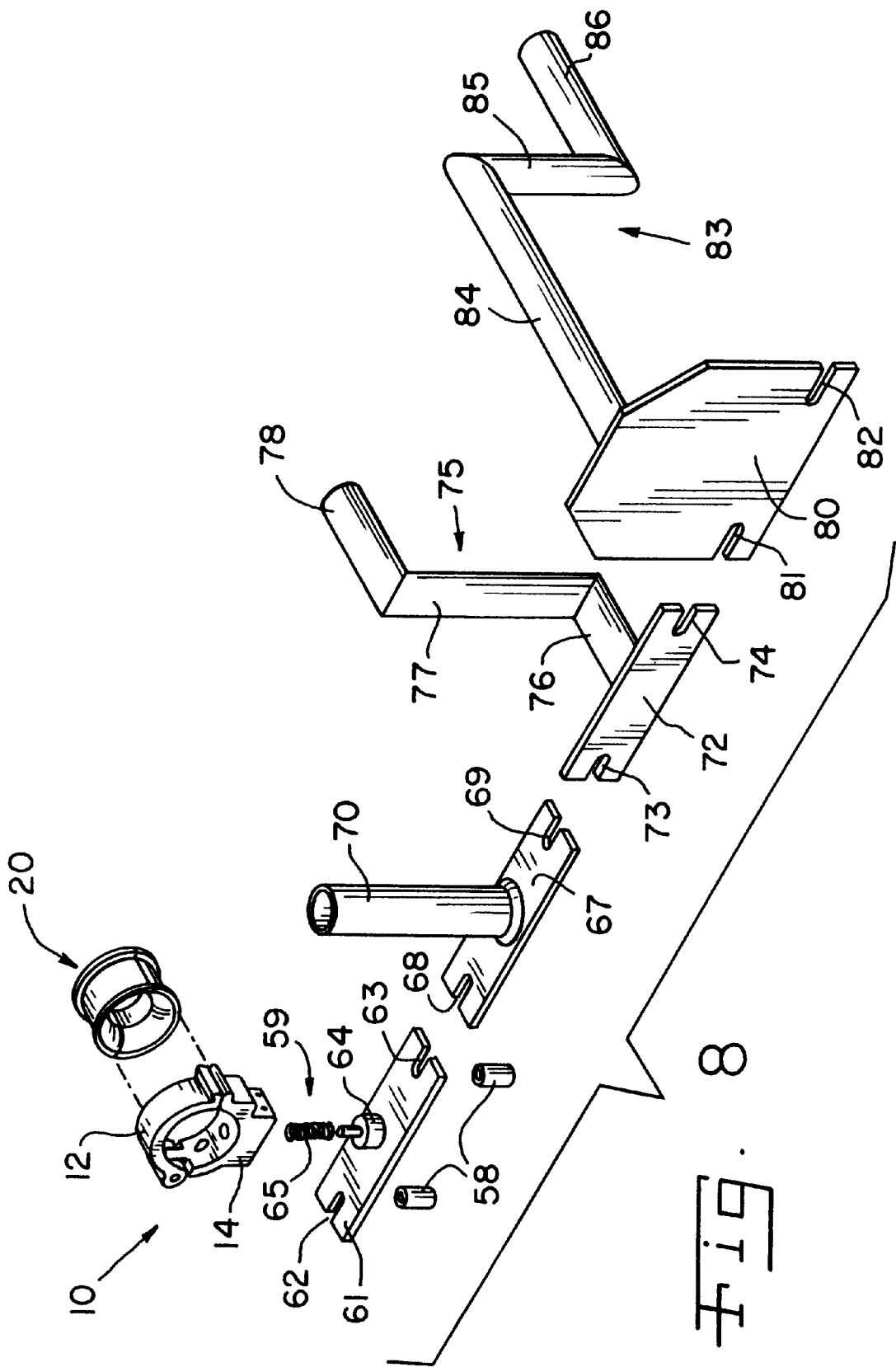
FIG. 8 is an exploded perspective view of various clamp mounting configurations that may be utilized.

With reference now to FIG. 8 there is depicted clamp 10 and various mounting structures/configurations which can be utilized for mounting clamp 10 onto the robot. Preferably, clamp 10 is used with grommet 20 and may be mounted by itself onto a robot (not shown) through the use of bolts and/or screws extending through the various bore 54, 55, and 56. However, it is generally desirable to utilize a mount to attach or secure clamp 10 to the robot.

One type of mount is a spring assembly 59. Spring assembly 59 includes a generally rectangular mounting plate 61 having a first bolt or screw notch 62 on one end thereof and a second bolt or screw notch 63 on another end thereof. Notches 62 and 63 are utilized for attaching the plate 61 to the robot. If necessary, steel standoffs 58 of 1¼" length or otherwise may be used in conjunction with the mounting bolts or screws (not shown). Mounting plate 61 includes a stud structure 64 onto which is received a spring 65. Spring 65 is preferably a compression spring and, more particularly, a fatigue resistant square wire die spring.

Figure 10:
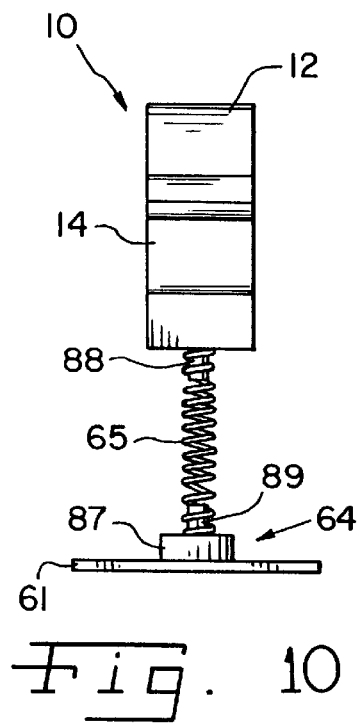
FIG. 10 is an enlarged side view of the spring mount type of mounting configurations shown in FIG. 8, wherein the clamp is coupled to a compression spring which is coupled to a mounting plate.
Figure 11:
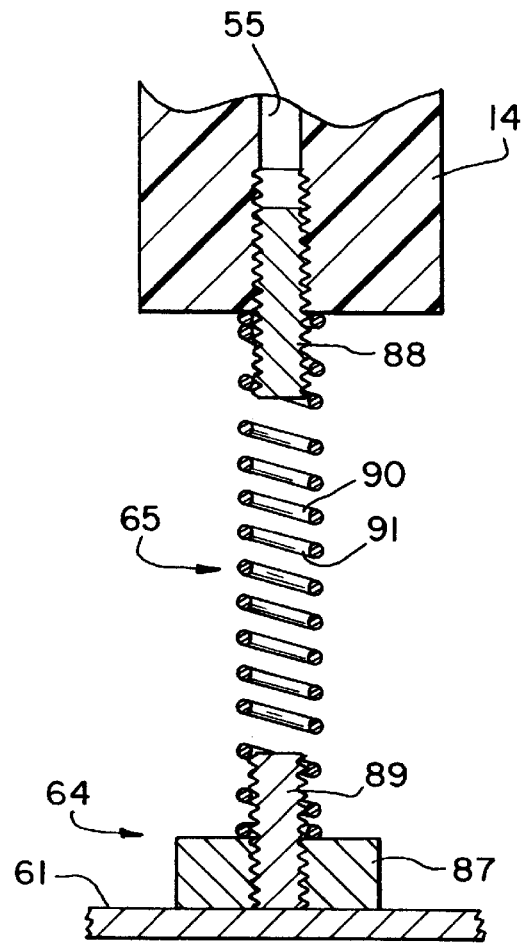
FIG. 11 is an enlarged, partial cross-sectional side view of FIG. 10.

With reference now to FIGS. 10 and 11, spring assembly 59 is depicted in greater detail. Stud structure 64 includes a mounting block 87 into which is disposed a threaded stud, bolt, or screw 89. Threaded stud 89 is threaded into one end of spring 65 which consists of many turns or coils, two turns or coils 90 and 91 of which are numbered. As threaded stud 89 is threaded or received into one end of spring 65, spring 65 axially elongates or expands around and proximate to threaded stud 89, causing the coils thereabout to radially compress against threaded stud 89. This holds spring 65 tight against threaded stud 89 and also makes backing out threaded stud 89 very difficult creating an almost permanent mounting.

Extending through bore 55 of base 14 is a threaded stud, bolt, or screw 66 that is threaded or received into another end of spring 65. As threaded stud 66 is threaded or received into another end of spring 65, spring 65 axially elongates or expands around and proximate to threaded stud 66 causing the coils thereabout to radially compress against threaded stud 66. This holds spring 65 tight against threaded stud 66 and also makes backing out threaded stud 66 very difficult creating an almost permanent mounting.

If a spring is not desired, a generally rectangular mounting plate 67 may be utilized having a central, fixed, perpendicular tube section 70 of any length. Mounting plate 67 includes first and second bolt/screw notches 68 and 69 on either ends thereof. Additionally shown is an angle mounting 75 having a generally rectangular mounting plate 72 having first and second bolt/screw notches 73 and 74 on either ends thereof. Extending perpendicular to mounting plate 72 is a first pipe section 76. Perpendicularly coupled to an end of first pipe section 76 opposite mounting plate 72 is a second pipe section 77. Perpendicularly coupled to an end of second pipe section 77 opposite pipe section 76 is a third pipe section 78. Each pipe section 76, 77, and 78 may be of any length. Lastly, another angle mounting 83 is shown. Angle mounting 83 includes a mounting plate 80 having first and second bolt/screw notches 81 and 82 on either ends thereof. Perpendicularly coupled to mounting plate 80 is a first pipe section 84. Perpendicularly coupled to another end of first pipe section 84 is a second pipe section 85. Perpendicularly coupled to an end of second pipe section 85 opposite pipe section 84 is a third pipe section 86. Each pipe section 84, 85, and 86 may be of any length.

It should be understood that various pipe structures may be utilized. Custom mounting plates may also be utilized. Also, any mounting configuration may be used in combination with others.

Figure 9:
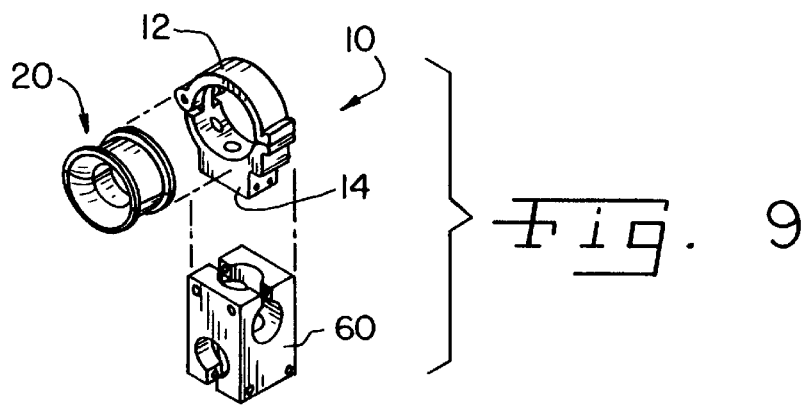
FIG. 9 is an exploded perspective view of an alternative clamp mounting configuration.

With reference now to FIG. 9, a further type of mount is shown. A mounting block 60 can be utilized with the various mounting plates/configurations in conjunction with bolts or screws. Mounting block 60 may be mounted in various orientations, and may also be used in conjunction with the various mounts shown to retain clamp 10.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A clamp assembly for releasably retaining one of a welder, a fluid hose and an electrical cable onto a robot, the clamp assembly comprising:

a mount adapted to be secured to the robot assembly, said mount having a first threaded stud;

a clamp adapted to releasably retain said one of said welder, said fluid hose and said electrical cable, said clamp having a second threaded stud, said second threaded stud mounted within said clamp, a threaded portion of said second threaded stud extending beyond said clamp; and a spring having a first end and a second end, said first threaded stud received in and contacting said first end, and said extending threaded portion of said second threaded stud received in and contacting said second end.

2. The clamp assembly of claim 1, wherein said spring is a compression spring.

3. The clamp assembly of claim 1, wherein said first threaded stud is a bolt.

4. The clamp assembly of claim 1, wherein said clamp comprises:

a base, said base having a first arcuate surface, a first hinge portion on one end of said first arcuate surface, and a first latch portion on another end of said first arcuate surface;

a mounting bore in said base and in communication with said first arcuate surface; and an arm, said arm having a second arcuate surface, a second hinge portion on one end of said second arcuate surface, and a second latch portion on another end of said second arcuate surface;

said first and second hinge portions defining a pivot allowing said first and second latch portions to abut;

said first and second arcuate surfaces defining an opening when said first and second latch portions abut.

5. The clamp assembly of claim 4, wherein said clamp is made from aluminum.

6. The clamp assembly of claim 4, wherein said first hinge portion is defined by a first projection having an axial bore therethrough, and said second hinge portion is defined by second and third projections each having an axial bore therethrough and defining an area therebetween adapted to receive said first projection, and further comprising a pin extending through said axial bores.

7. A clamp assembly for holding a fluid hose or electrical cable onto a robot, the clamp assembly comprising:

a mount having a first threaded stud;

a clamp having a second threaded stud, said second threaded stud mounted within said clamp, a threaded portion of said second threaded stud extending beyond said clamp; and a spring defined by a plurality of coils each having a coil diameter, said spring having a first end and a second end, said first threaded stud received into and contacting said first end of said spring and configured for axially expanding a first set of coils of said plurality of coils proximate said first threaded stud and for thereby reducing said coil diameter of said coils in said first set of coils and causing radially inward compression of said first set of coils against said first threaded stud; and said extending threaded portion of said second threaded stud received into and contacting said second end of said spring and configured for axially expanding a second set of coils of said plurality of coils proximate said second threaded stud and for thereby reducing said coil diameter of said coils in said second set of coils and causing radially inward compression of said second set of coils against said second threaded stud.

8. The clamp assembly of claim 7, wherein said clamp is made from aluminum.

9. The clamp assembly of claim 7, wherein said spring is a compression spring.

10. The clamp assembly of claim 7, wherein said clamp comprises:

a base, said base having a first arcuate surface, a first hinge portion on one end of said first arcuate surface, and a first latch portion on another end of said first arcuate surface;

a mounting bore in said base and in communication with said first arcuate surface; and an arm, said arm having a second arcuate surface, a second hinge portion on one end of said second arcuate surface, and a second latch portion on another end of said second arcuate surface;

said first and second hinge portions defining a pivot allowing said first and second latch portions to abut;

said first and second arcuate surfaces defining an opening when said first and second latch portions abut.

11. The clamp assembly of claim 10, wherein said first hinge portion is defined by a first projection having an axial bore therethrough, and said second hinge portion is defined by second and third projections each having an axial bore therethrough and defining an area therebetween adapted to receive said first projection, and further comprising a pin extending through said axial bores.

12. The clamp assembly of claim 10, wherein said second threaded stud is a bolt that extends through a bore in said base.

13. The clamp assembly of claim 10, further comprising a grommet disposed in said opening.

14. A clamp for releasably retaining a fluid hose or electrical cable onto a robot, the clamp comprising:

a base having a top first retaining portion defining a first contact surface and having a bottom surface opposite said first contact surface, a first pivot portion on one end of said first contact surface, and a first latch portion on another end of said first contact surface, said base further including a mounting bore therethrough, said mounting bore extending from said first contact surface to said bottom surface;

a threaded stud mounted in said mounting bore, a threaded portion of said threaded stud extending beyond said bottom surface of said base; said threaded stud adapted to be retained on the robot via a mounting assembly;

said mounting assembly including a spring;

said spring having a first end and a second end;

said extended threaded portion being received in and contacting said second end;

an arm having a second retaining portion defining a second contact surface, a second pivot portion on one end of said second contact surface, said first and second pivot portions defining a hinge, and a second latch portion adapted to cooperate with said first latch portion to provide a releasable clasp when abutting;

said first and second retaining portions defining a containment area when said first and second latch portions abut; and a grommet sized to be retained in said containment area.

15. The clamp of claim 14, wherein said base and said arm are made from 6061 aluminum.

16. The clamp assembly of claim 14, wherein said first pivot portion is defined by a first projection having an axial bore therethrough, and said second pivot portion is defined by second and third projections each having an axial bore therethrough and defining an area therebetween adapted to receive said first projection, and further comprising a pin extending through said axial bores.

17. The clamp of claim 14, wherein said mounting assembly includes a mounting plate and a square wire spring.

18. The clamp of claim 14, wherein said first and second contact surfaces define a circle when said first and second latch portions abut.

* * * * *

UNITED STATES PATENT AND TRADEMARK OFFICE
CERTIFICATE OF CORRECTION

PATENT NO. : 6,145,793  
DATED : November 14, 2000  
INVENTOR(S) : Erwin K. Kroulik et al.

Page 1 of 1

It is certified that error appears in the above-identified patent and that said Letters Patent is hereby corrected as shown below:

<u>Title page,</u>
[56] under "references cited" insert the following --

| | | | |
|---|---|---|---|
| 4,011,397 | 3/1997 | Bouche | 248/74.1 |
| 5,593,125 | 1/1997 | Storz et al. | 248/231.5 |
| 936,438 | 10/1909 | Fitzgerald | 248/74.1 |
| 5,390,876 | 2/1995 | Hatano et al. | 248/74.1 |
| 5,494,245 | 2/1996 | Suzuki et al. | 248/74.1 |
| 5,096,342 | 5/1999 | Kraus | 248/74.1 -- |

Signed and Sealed this

Twenty-fifth Day of September, 2001

Attest:

NICHOLAS P. GODICI

Attesting Officer

Acting Director of the United States Patent and Trademark Office